March 12, 1940. H. A. DE VRY Re. 21,388

FRAMING DEVICE FOR MOTION PICTURE PROJECTORS

Original Filed March 12, 1934 4 Sheets-Sheet 1

Inventor
Herman A. DeVry
By: Zabel & Wells Attys

March 12, 1940. H. A. DE VRY Re. 21,388

FRAMING DEVICE FOR MOTION PICTURE PROJECTORS

Original Filed March 12, 1934 4 Sheets-Sheet 2

Inventor
Herman A. DeVry
By: Isabel H. Wallace Attys.

March 12, 1940. H. A. DE VRY Re. 21,388

FRAMING DEVICE FOR MOTION PICTURE PROJECTORS

Original Filed March 12, 1934 4 Sheets-Sheet 3

Inventor
Herman A. DeVry
By: Zabel & Wells Attys.

March 12, 1940. H. A. DE VRY Re. 21,388

FRAMING DEVICE FOR MOTION PICTURE PROJECTORS

Original Filed March 12, 1934 4 Sheets-Sheet 4

Inventor
Herman A. DeVry
By: Isabel Wells Attys.

Reissued Mar. 12, 1940 Re. 21,388

UNITED STATES PATENT OFFICE 21,388

FRAMING DEVICE FOR MOTION PICTURE PROJECTORS

Herman A. de Vry, Chicago, Ill.

Original No. 2,041,236, dated May 19, 1936, Serial No. 715,056, March 12, 1934. Application for reissue May 14, 1938, Serial No. 208,060

15 Claims. (Cl. 88—17)

My invention relates to framing devices for motion picture projectors.

In projectors, the matter of properly framing the picture on the screen has always been a source of considerable difficulty, and many different types of mechanism have been employed for this purpose. Some of these mechanisms move the light aperture with respect to the film; while others move the film sprocket with respect to a stationary aperture. In any event the problem of how to avoid getting the shutter out of synchronism with the film sprocket has made it necessary to employe various more or less complicated and expensive mechanisms to get a satisfactory result.

It is the purpose of this invention to provide a simple and effective means for framing the picture which has no influence upon the shutter operating mechanism tending to move it out of synchronism with the intermittent film moving mechanism.

It is also a purpose of this invention to provide in a motion picture machine a flexible chain drive for the film moving mechanisms in which the chain is also acted upon to register the picture at the aperture.

It is also a purpose of this invention to provide a mechanism of this character which makes it unnecessary to provide additional gears and connections to compensate for the shift of the intermittent drive mechanism necessary for framing.

It is a further purpose of this invention to provide a framing device which utilizes the existing drive mechanism for the film in such a fashion as to permit the placing of the intermittent drive sprocket relatively close to the aperture through which the picture is projected whereby the advantages of this construction may be obtained in conjunction with an accurate yet easily operated framing mechanism.

In carrying out the purposes of my invention, I contemplate the use of a drive gear for driving a silent chain or perforated strip which in turn drives the shutter and also the intermittent film driving mechanism as well as the film take-up mechanism. Through the medium of this flexible drive member and the sprocket wheels for driving the shutter and the intermittent gear mechanism together with an idler sprocket, I apply the framing mechanism in such a fashion that moving of the film sprocket and with it the film up and down with respect to the aperture may be accomplished without in any way changing the position of the shutter.

For this result, I employ a mechanism for moving the intermittent drive mechanism up and down with respect to the aperture and with it a mechanism simultaneously moving the flexible drive member between its connection with the intermittent gear drive and its connection with the idler sprocket and the shutter sprocket in such fashion as to maintain the distance along the flexible drive member between the three points just mentioned practically the same for all framing positions.

Other objects and advantages of the device will appear as the description proceeds in connection with the accompanying drawings. It is to be understood, however, that the drawings and description are illustrative only and are not to be taken as limiting the invention except in so far as it is limited by the claims.

Figure 1:
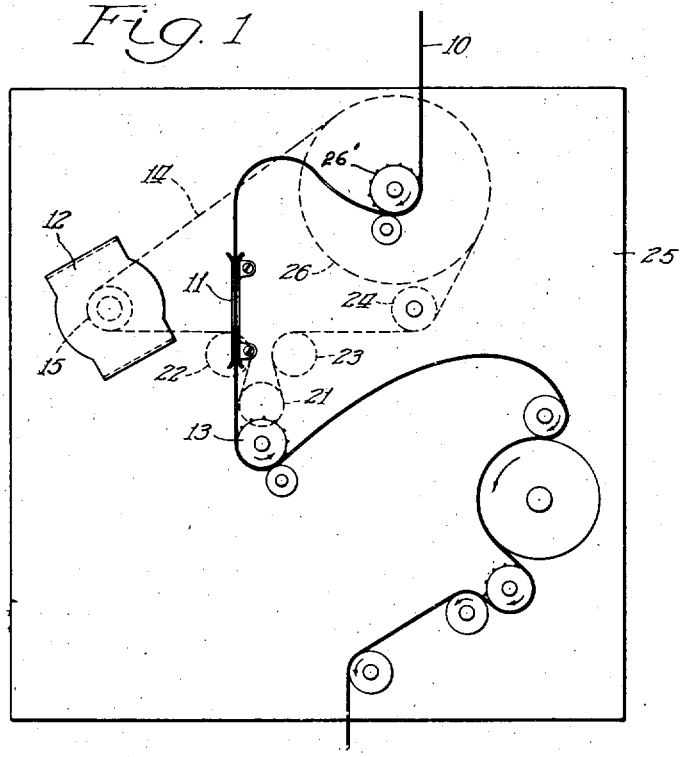
Fig. 1 is an elevation partly in section of a portion of the projector showing the path of the film as it is driven past the aperture.
Figure 4:
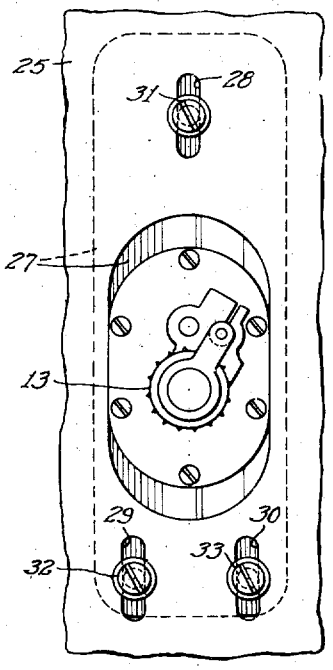
Fig. 4 is an enlarged detail showing the mounting of the intermittent mechanism.

Referring now in detail to the drawings, the path of the film 10 past the light aperture 11 is shown most clearly in Fig. 1. The shutter is indicated generally at 12, and the film driving sprocket is shown at 13.

Now in the insertion of the film, it is necessary to have the individual pictures registered accurately with the aperture 11, and, in order to do this, it is necessary to provide for some means of adjusting the aperture and film with respect to each other either by moving the film sprocket with respect to the aperture or by moving the aperture with respect to the sprocket.

In the present mechanism, I employ means for adjusting the film sprocket and its intermittent drive mechanism with respect to the aperture which is stationary thus making it unnecessary to move the shutter or the light source and thus disturb the alignment of the aperture with these two devices.

Figure 2:
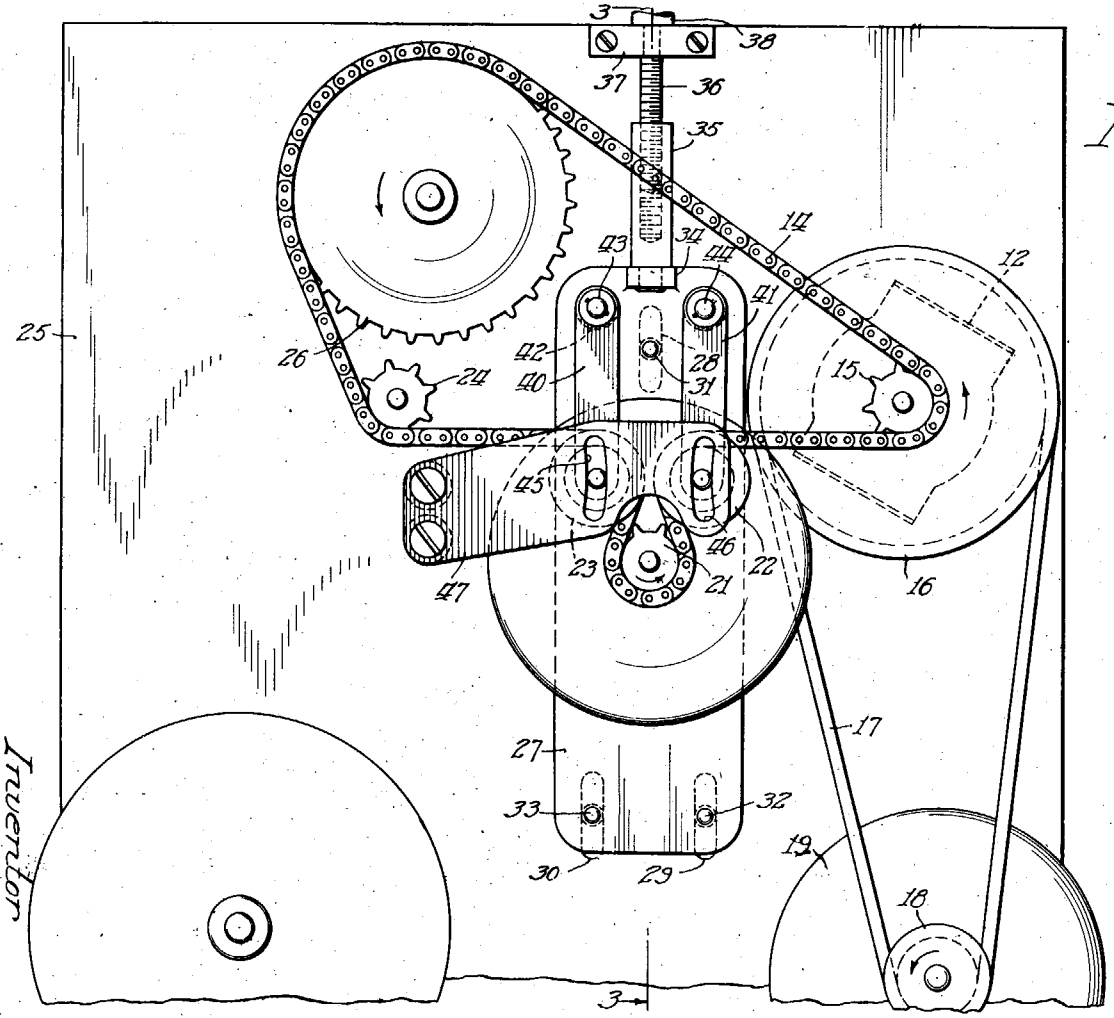
Fig. 2 is an elevation showing the opposite side of the mechanism from that illustrated in Fig. 1.

Now referring more particularly to Figs. 1 and 2, it will be noted that the shutter and the intermittent drive mechanism for the film sprocket are driven by the common flexible drive member 14 which receives its power from the sprocket wheel 15 on the shutter shaft, this sha.. being driven by the pulley 16, belt 17, and pulley 18 from the motor 19. The flexible drive member 14 must be of a type which permits of no slippage between the shutter sprocket wheel 15 and the sprocket wheel 21 on the intermittent drive mechanism because this sprocket wheel 21 must move the film in synchronism with the movements of the shutter in order to have the film stationary during the periods when the shutter permits the light to pass therethrough and must move the film during the periods when the shutter blocks the light passage. The details of the intermittent drive mechanism are of no importance to the present invention and may be of any suitable type.

Between the sprocket wheel 15 and the sprocket wheel 21, I provide an idler 22 over which the drive member 14 passes, and this idler may be merely a smooth pulley. A similar idler 23 is provided just opposite idler 22, and then an idler sprocket wheel 24 is mounted upon the supporting frame 25 directly opposite the sprocket wheel 15 and the same distance from sprocket wheel 21 as sprocket wheel 15 is. The flexible drive then passes around a sprocket wheel 26 which drives the shaft to which is attached sprocket 26' which feeds the film to the aperture 11. The intermittent drive mechanism is mounted upon a plate 27 which plate is guided by means of the slots 28, 29 and 30, and pins 31, 32 and 33. The film sprocket 13 is, of course, carried by the intermittent mechanism and moves up and down with the plate 27 as the same is adjusted. This plate has the lug 34 and the screw-threaded stem 35 to receive the adjusting screw 36 mounted on the main frame 25 by means of lug 37. By turning the knurled handle 38, the screw 36 may be caused to move the plate 27 up and down and thus adjust the sprocket 13 and with it the film up and down in the aperture 11 for framing a picture.

This is a simple means of adjusting the film sprocket to frame the picture and the vibrations do not tend to change the adjustment so that once the film is framed properly it will remain so until there is some change in the distance between pictures or until the end of the film is reached.

Moving of the film sprocket 13 and the intermittent mechanism up and down does, however, exert an influence on the relative positions of the drive sprocket wheels 15 and 21 driving the shutter and the intermittent mechanism respectively. This change in the position of the sprocket wheels would throw them out of synchronism and thus spoil the synchronism between the shutter and the intermittent drive sprocket.

In order to overcome this, I provide means acting on the flexible drive member 14 to maintain the length of this drive member between its driving connection with the sprocket wheel 15 and its driving connection with the sprocket wheel 21 substantially the same for all positions of adjustment of the intermittent drive mechanism.

Figure 3:
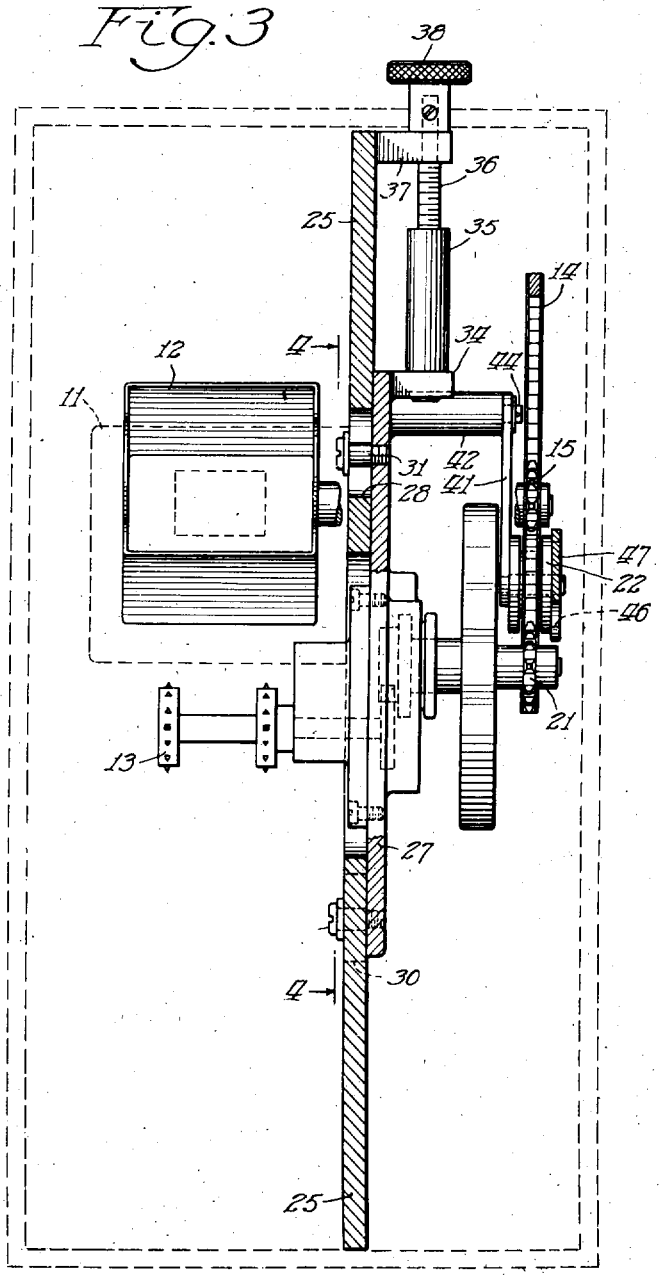
Fig. 3 is a section substantially on the line 3—3 of Fig. 2.

The means which I employ consist of the idler pulleys 22 and 23 which are rotatably mounted upon the arms 40 and 41 which are pivoted on the plate 27 by means of the upstanding bosses or studs, such as 42 shown in Fig. 3, and the pivot pins 43 and 44. These arms thus are movable vertically with the plate 27 which forms a support for the entire intermittent drive mechanism. Cooperating with the arms 40 and 41 to properly position the pulleys 22 and 23 to maintain the desired constant length of flexible drive between sprocket wheels 15 and 21 are a pair of slots shown at 45 and 46 in Fig. 2, these slots being formed in the bar 47 which is mounted upon the supporting plate 25. The slots 45 and 46 are so shaped that in movement of the plate 27 up and down they will move the pulleys 22 and 23 in and out a sufficient amount to compensate for the change in distances that would otherwise take place along the drive member 14 between the sprocket wheels 15 and 21.

Thus I have provided a simple effective mechanism for framing the film in the aperture 11 without disturbing the synchronism of the drive between the shutter and the intermittent film sprocket. Since the position of the shutter is unchanged, obviously no change is made in the light path, and the framing is accomplished without the necessity of providing complicated gear mechanisms or shifting mechanisms for shifting the entire light transmitting system. The flexible drive member 14 may be a well known silent chain drive or any other suitable member such as a perforated strip or belt drive since the only essential feature it must possess is that of providing a non-slipping drive connection between the shutter shaft and the intermittent mechanism drive shaft.

Figure 5:
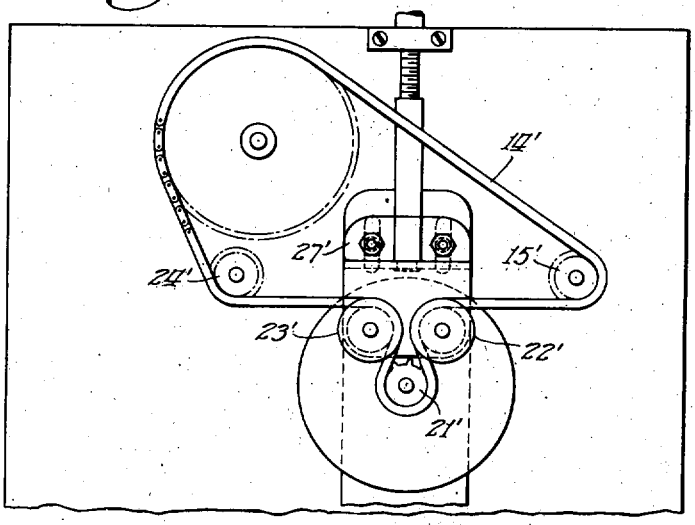
Figs. 5 and 6 show modifications of the mechanism which may be employed to accomplish substantially the same result.
Figure 6:
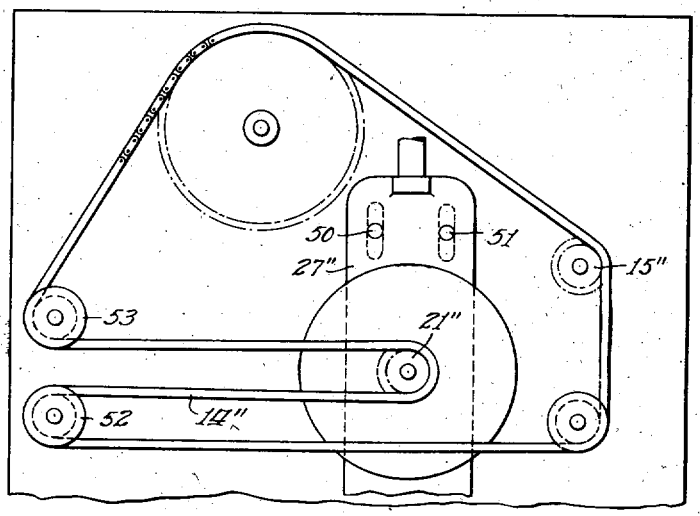

Referring now to Figs. 5 and 6, I show in Fig. 5 a mechanism somewhat similar to that shown in Figs. 1 to 4 except that in the present instance the adjustment of the pulleys 22' and 23' is not quite so accurate as in the case of the main form. It will be noted here, however, that as the plate 27' is moved upwardly from the position shown in Fig. 5, the tops of the pulleys 22' and 23' will move above the level of a line connecting the lower edges of sprocket wheels 15' and 24'. This takes up a substantial amount of slack that is produced by raising the sprocket wheel 21', and thus substantially the same result is accomplished as in the mechanism shown in Figs. 1 to 4.

In Fig. 6, the plate 27'' is vertically adjustable as in the other forms on pins such as 50 and 51. The drive sprocket wheel 15'' corresponds to the drive sprocket wheel 15 in Figs. 1 to 4, and the intermittent drive mechanism is connected to the sprocket wheel 21'' and mounted upon the plate 27''. In this form, I provide a pair of idlers 52 and 53 which are at a substantial distance from the sprocket wheel 21''. It is evident, of course, that, if 21'' is moved up or down from the exact position shown, there will be very little change in the length of the flexible drive member 14'' between the sprocket wheel 15'' and the gear 21''. This mechanism is not exactly accurate, but the change in the relative position of the shutter sprocket wheel and the intermittent mechanism sprocket wheel is so slight that it does not affect the synchronism between the film movement and the shutter movement sufficiently to be objectionable.

From the above description, it is believed that the construction and operation of this device will be clear to those skilled in this art and the advantages thereof readily apparent.

In certain of the claims I have used the term "positive flexible drive" to distinguish the non-slipping flexible drive means such as the sprocket chain shown from a slipping drive member such as the ordinary belt.

Having thus described my invention, what I claim as new and desire to secure by Letters Patent is:

1. A framing device for motion picture machines having an intermittent film driving mechanism and a shutter driven in synchronism with the intermittent mechanism by means of a flexible drive connection of the chain type, means providing a loop in the flexible drive connection, means for bodily shifting the intermittent film driving mechanism and the film driven thereby with respect to the aperture for framing, and means simultaneously lengthening or shortening the loop to avoid disturbing the synchronous relations of the intermittent movements with the shutter.

2. A motion picture machine having a light aperture, means for guiding a strip of film past said aperture, an intermittent film feed device for advancing said film past said aperture, a sprocket wheel for driving said device, a shutter, a sprocket wheel for driving said shutter, a sprocket chain connecting said sprocket wheels, said film feed device and its sprocket wheel being adjustable as a unit with respect to said aperture to frame film pictures in said aperture, and means engaging said chain between said wheels for maintaining the wheels in the same relative angular position for all framing positions of said adjustable film feed device.

3. A motion picture machine having a light aperture, means for guiding a strip of film past said aperture, an intermittent film feed device for advancing said film past said aperture, a sprocket wheel for driving said device, a drive mechanism, a sprocket wheel driven thereby, a sprocket chain connecting said sprocket wheels, said film feed device and its sprocket wheel being adjustable as a unit with respect to said aperture to frame film pictures in said aperture, and means cooperating with said chain to maintain substantially the same length of chain between said wheels in all framing positions of said adjustable film feed device.

4. A framing device for motion picture machines or the like including a film, means for intermittently feeding said film, a shutter, means for driving said shutter, the film feeding means being shiftable relative to the shutter, an endless flexible drive element interconnecting the shutter driving means with the film feeding means for synchronously driving both of said means, means for causing a relative bodily shifting between said two first aforesaid means, and means engaging with said drive element to compensate for such shifting to maintain required synchronous driving relationship between said two first aforesaid means.

5. A motion picture mechanism having an aperture and means for feeding film past said aperture including mechanism for intermittently feeding the film, a sprocket wheel driving said mechanism, an endless flexible drive element engaging said sprocket wheel, a second sprocket wheel spaced from said first named sprocket wheel, and connected thereto by said flexible drive element, said intermittent mechanism being shiftable to frame the film at the aperture, and means engaging the flexible drive element between said wheels and operable by the shifting of said mechanism to maintain the wheels in the same relative angular position for all framing positions of said intermittent mechanism.

6. A motion picture machine having in combination, an aperture, means for feeding film past said aperture including an intermittent drive mechanism, and a shutter, means to operate the shutter in synchronism with the intermittent mechanism whereby the shutter is open when the film is stationary, drive shafts for said shutter operating means and said mechanism, an endless flexible drive element connecting said shafts, said intermittent mechanism being adjustable independently of the shutter to frame the picture on the film in said aperture and means engaging said endless flexible drive element between said shafts for maintaining the shafts in the same relative angular position for all framing positions of said intermittent mechanism.

7. A driving mechanism for devices having a plurality of members driven in synchronism, one thereof being adjustable in functioning position relatively to the other, comprising a common flexible drive connection of the chain type; means providing a loop in said flexible drive connection; means for shifting the position of one member; and means for simultaneously changing the length of portions of the said loop to maintain the synchronous movement relations of the respective members.

8. A driving mechanism comprising a plurality of driven members cooperating therewith; a frame for the support thereof; means for shifting the position of one of said driven members with respect to said frame and with respect to the other of said driven members; sprocket wheels respectively for said driven members; a sprocket chain cooperating with said sprocket wheels; and means engaging said chain between said sprocket wheels for maintaining the said chain in engagement therewith and of proper length therebetween to maintain the said wheels in the same said relative angular operating position for all positions of shifting of the said shiftable driven member.

9. A driving mechanism comprising a drive chain; a plurality of chain sprockets engaging therewith; a plurality of driven shafts respectively cooperating with said sprockets; means for shifting the relative positioning between said respective driven members; and means for maintaining synchronism between said sprockets during and after shifting movements comprising a member engaging said chain between said sprockets and movable with the shifting movements of said shiftable member to maintain such a length of chain between said sprockets as to insure synchronous rotation thereof.

10. A driving mechanism comprising a frame member, a plurality of shafts journaled therein; sprockets respectively mounted upon said shafts; means for shifting one of said shafts in a direction at right angles to its axis; a chain engaging said sprockets; means engaging said chain between said sprockets and forming a loop therein; and means movable with the shifting of said shiftable shaft for adjusting the loop in said chain by an amount sufficient to maintain synchronous rotation between said sprockets.

11. A driving mechanism comprising a frame member, a plurality of shafts journaled therein; sprockets respectively mounted upon said shafts; means for shifting one of said shafts in a direction at right angles to its axis; a chain engaging said sprockets; means engaging said chain between said sprockets and forming a loop therein; means movable with the shifting of said shiftable shaft for adjusting the loop in said chain by an amount sufficient to maintain synchronous rotation between said sprockets; and an auxiliary chain engaging means similarly movable with said shiftable shaft member for taking up slack in said chain.

12. A driving mechanism comprising a frame member; a plurality of shafts journaled therein; sprockets respectively mounted upon said shafts; means operable by said shaft in synchronism with the other of said shafts; means for rotating said operable means and said shaft on the axis of said shaft; a chain engaging said sprockets; means engaging said chain between said sprockets and forming a loop therein; and means movable with the shifting of said rotatable shaft for adjusting the loop in said chain by an amount sufficient to maintain synchronous rotation between said sprockets.

13. A driving mechanism comprising a frame member, a plurality of shafts journaled therein; driven means cooperating with said shafts, part of said driven means comprising a timed mechanism driven by said shaft and rotatable as a unit around the axis of said shaft; the other of said shafts having a second driven mechanism synchronous with the first driven mechanism; means for rotating said first driven mechanism; sprockets cooperating with said shafts; a drive chain engaging said sprockets; means engaging said chain between said sprockets and forming a loop therein; and means cooperating with said second rotatable driven mechanism for adjusting the chain engaging means to maintain a loop therein of proper size and shape to cause said shafts to operate in synchronism.

14. A driving mechanism comprising a frame member; a plurality of shafts journaled therein; driven means cooperating with said shafts; part of said driven means comprising a timed mechanism driven by said shaft and rotatable as a unit around the axis of said shaft, the other of said shafts having a driven mechanism synchronous with the first driven mechanism; means for rotating said first driven mechanism; sprockets cooperating with said shafts; a drive chain engaging said sprockets; means engaging said chain between said sprockets and forming a loop therein; means cooperating with said rotatable driven mechanism for adjusting the chain engaging means to maintain a loop therein of proper size and shape to cause said shafts to operate in synchronism; and a secondary chain engaging mechanism actuated along with said rotatable mechanism for taking up slack in said chain.

15. A driving mechanism for a plurality of synchronously rotating members, one thereof having a fixed axis, the other thereof comprising a rotatable structure having a primary shaft in the axis of rotation, a secondary shaft geared thereto having a radius of gyration with respect to said primary shaft; means for maintaining synchronous rotation between said first mentioned driving shaft and said secondary shaft during rotative translational movements of said secondary shaft comprising sprockets upon said primary shafts, a driving chain engaging said sprockets, means engaging said chain between said sprockets and mechanism for adjusting the position of said chain engaging means in accordance with the rotative translational movement of said secondary shaft.

HERMAN A. DE VRY.